Jan. 13, 1925.
H. T. KELLY
PRESSURE REGULATOR
Filed Nov. 16, 1922
1,522,632
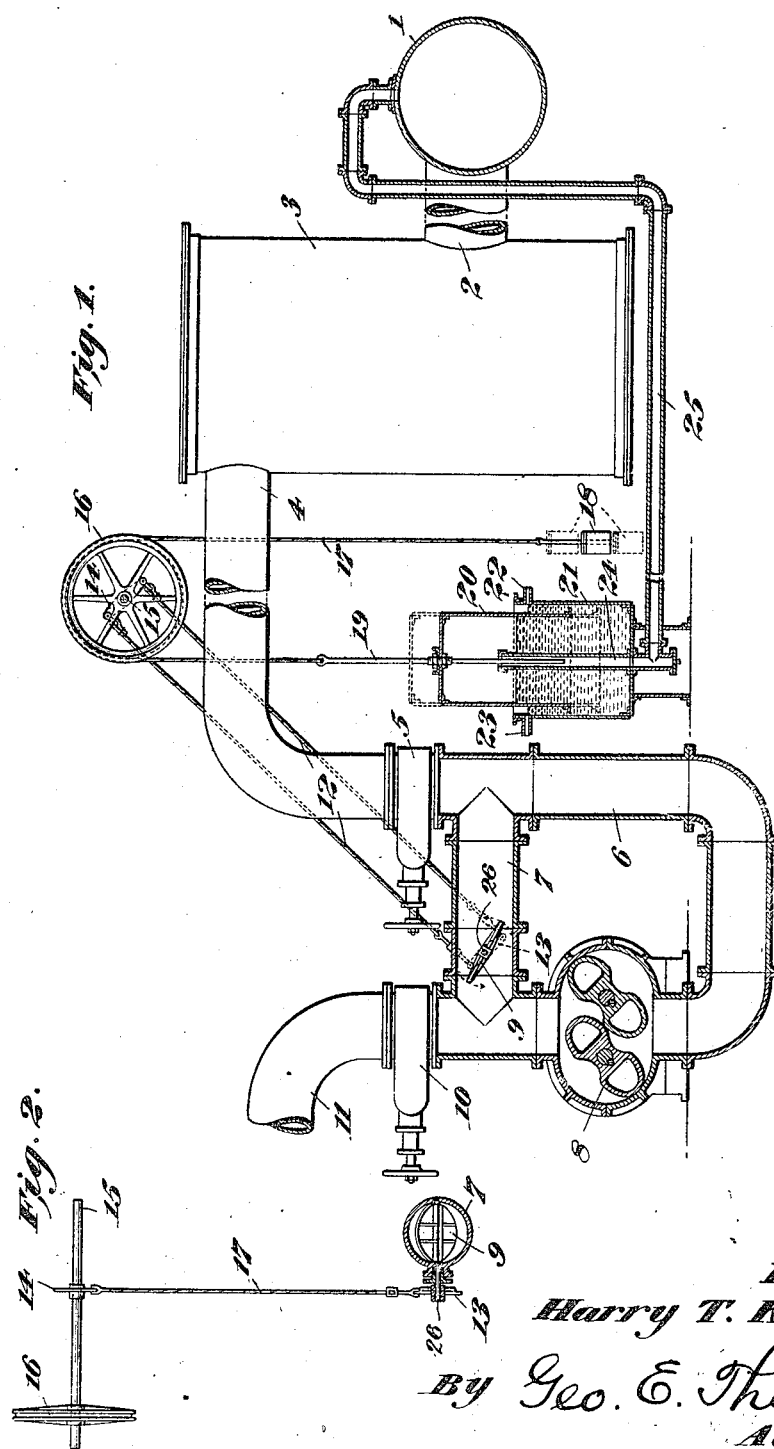
Inventor
Harry T. Kelly.
By Geo. E. Thackray
Attorney Patented Jan. 13, 1925.

1,522,632

UNITED STATES PATENT OFFICE.

HARRY T. KELLY, OF BOROUGH OF WESTMONT, PENNSYLVANIA.

PRESSURE REGULATOR.

Application filed November 16, 1922. Serial No. 601,276.

*To all whom it may concern:*

Be it known that I, HARRY T. KELLY, a citizen of the United States, and a resident of the borough of Westmont, in the county of Cambria, and State of Pennsylvania, have invented certain new and useful Improvements in Pressure Regulators; and I do hereby declare the following to be a full, clear, and exact description of the invention, such as will enable others skilled in the art to which it appertains to make and use the same.

My invention relates to a pressure regulator, which is especially adapted to regulate the suction or the pressure below atmospheric pressure, in connection with a constant speed exhauster used in exhausting gases from any form of apparatus to which it is applicable.

One of the special uses to which my apparatus may be put is in connection with handling the distilled gases from by-product coke ovens, and in order to simplify the illustration and description of my invention I will confine myself to this application, but with the understanding that it may be used for any other purpose for which it may be suited.

Referring now to the annexed sheet of drawings, which forms part of this specification, and in which like characters refer to like parts:—Figure 1 is a diagrammatic sectional elevation of my improved device, illustrating the application of my invention, and Figure 2 is a detailed sectional elevation of the by-pass valve and its connections taken at right angles to Figure 1.

Referring now to the characters of reference on the drawings:—1 indicates the gas main in which a substantially constant partial vacuum of about — 4 inches of water pressure is to be maintained with a variation not to exceed one-eighth inch, plus or minus therefrom, these figures given for the partial vacuum and the variation thereof being merely typical, and I wish it understood my apparatus may be operated at any pressure or partial vacuum whatsoever to which it may be adapted for the purposes desired.

The gases may pass from the main 1 through the pipe 2 and through other apparatus, which in this case I have illustrated as a primary cooler 3, and issue thence through the main pipe 4 through the shut-off or regulating valve 5 into the suction main 6 of the exhauster and pressure producer 8. The exhauster may be of any of the well-known types and it is driven at substantially constant speed at the rate of about 140 revolutions per minute by an alternating current motor, and on account of the character of the driving mechanism, and for other considerations, this speed is maintained substantially constant and does not vary. This delivers gas through a pipe connected with the other side of the exhauster through the valve 10 into the delivery or discharge main 11, and due to the variation in the amount of gas supplied to the gas main and to the variations in the quantity of gas used or needed in the apparatus connected with the main 11, the pressure in the said delivery or discharge main 11 may vary from thirty inches to sixty inches of positive water pressure above the atmosphere, or to any extent desired or permissable.

In accordance with my invention the exhauster 8 must run at a substantially constant speed, and as the partial vacuum in the gas main must be kept constant in order to maintain the proper conditions in the coke ovens and their appurtenances, any lowering of the quantity of gas in the gas main 1 would tend to produce a greater partial vacuum therein, and any increase in the quantity of gas in the gas main 1 would tend to make a less partial vacuum therein, or might produce pressure above the atmospheric.

My apparatus is so designed as to obviate these variations of pressure in the gas main and to maintain a partial vacuum therein substantially constant within very close limits.

In order to accomplish this I provide a by-pass pipe 7, which connects the suction main 6 with the delivery main leading from the exhauster to the valve 10 and to the discharge pipe 11, and in this by-pass pipe I rotatably mount a balanced or easily moved butterfly valve 9, adapted to open, close or partially close this by-pass. This butterfly valve 9 is mounted on a stem 26 which projects through and is journaled in the by-pass pipe and is provided with an arm 13 comprising a pair of oppositely extending levers securely mounted on the ends thereof, and these levers are connected by means of a wire rope or cable 12 with a somewhat similar arm 14 comprising a pair of levers secured on the line shaft 15. On this same line shaft 15 is firmly mounted a pulley wheel 16 having a grooved rim which receives the flexible connection or cable 17. One end of this cable 17 is provided with a counterweight 18 adapted to partially balance the parts connected to the other end of the cable, such as the rod 19 and the hollow cylindrical gasometer 20 secured thereto. The gasometer 20 is mounted in a tank 21 which is filled with liquid through the pipe 22 connected to any suitable source of supply and has a constant level discharge or overflow pipe 23. A connection is made from the gas main 1 to the interior of the gasometer by means of the inlet gas supply pipe 25 with the riser 24 as illustrated, and this supplies gas under the partial vacuum existing in the main 1 to the interior of the gasometer 20.

Should the supply of gas in the gas main 1 be reduced in quantity this will tend to cause the partial vacuum therein to be increased, and this lowers the gasometer 20 and thus turns the wheel 16 in such a way as to open or further open the butterfly valve 9, thereby decreasing the partial vacuum or suction in the suction main 6, with the result of maintaining and equalizing the constant partial vacuum in the gas main 1 communicating therewith.

Should the quantity of gas in the gas main 1 increase, this will increase the pressure therein or reduce the partial vacuum and the action of the apparatus would then be the opposite of that just explained.

It will thus be seen that my invention consists in closely regulating the partial vacuum in the gas main 1, the gases in which are exhausted therefrom by a constant speed exhauster 8, so that the exhauster does not have to vary in its predetermined number of revolutions in a given time, and this is accomplished by means of the gasometer 20 and its various connections co-operating with the easily moved and balanced butterfly valve in the by-pass 7, which connects the suction main 6, which leads to one side of the exhauster, with the discharge or pressure main and apparatus pipe 11, which leads from the other side thereof.

Although I have shown a primary cooler 3 interposed between the gas main 1 and the suction main 6, this may be omitted, and the gas main connected directly with or forming part of the suction main 6, as will be readily understood.

From the foregoing it will be seen that I use an exhauster driven by a constant speed alternating electric motor, so the speed of the exhauster is substantially uniform and the partial vacuum in the gas main is maintained within very close limits by means of the by-pass pipe, the valve therein, and the connections thereto, all operated by the tendency to variation of the pressure in the gas main itself.

This is different from other apparatus, by reason of the constant speed of my exhauster, whereas prior devices have varied the speed of the driving means of the exhauster to accomplish somewhat similar purposes.

Although I have shown and described my invention in considerable detail, I do not wish to be limited to the exact and specific details thereof, as shown and described, but may use such modifications in, substitutions for, or equivalents thereof as are embraced within the scope of my invention, or as pointed out in the claims.

Having thus described my invention, what I claim and desire to secure by Letters Patent is:—

1. The combination with a gas main, of a suction pipe connection leading therefrom, a substantially constant speed exhauster to which said suction pipe is connected, a delivery main connected to the discharge side of said exhauster, a by-pass pipe connecting said suction pipe and delivery main provided with a valve therein, and means for operating said valve actuated by the variations in pressure within said gas main.

2. The combination with a gas main, of a substantially constant speed exhauster connected thereto, a delivery main connected to the discharge side of said exhauster, a by-pass pipe connecting said gas main and delivery main, a valve mounted therein, a liquid-sealed gasometer provided with a pipe connection from said gas main and operative connections from said gasometer to said valve, whereby it is operated by the variations in the pressure in said gas main communicated to said gasometer.

3. The combination with a gas main, of a suction pipe connection therefrom, a substantially constant speed exhauster to the inlet side of which said suction pipe is connected, a delivery main connected to the discharge side of said exhauster, a by-pass pipe connecting said suction pipe and delivery main, a rotatable butterfly valve mounted on a stem in said by-pass pipe adapted to open, close, or partially open said by-pass, levers secured to the stem of said butterfly valve, connections leading from said levers to other levers secured to a line shaft, a pulley secured to said line shaft provided with a flexible connection passing around and over the same, one end of which flexible connection is attached to the movable portion of a liquid-sealed gasometer, and a pipe connection from said gas main leading to the interior of said gasometer, whereby said butterfly valve is adapted to be operated by the variations of pressure in the gas main.

4. The combination with a gas main, of a pipe connected therewith and also to a cooler, a suction pipe leading from said cooler and connected to the inlet side of a substantially constant speed exhauster, a delivery main connected with the discharge side of said exhauster, a by-pass pipe connecting said suction pipe and said delivery main, a valve mounted in said by-pass pipe, and means for operating said valve actuated by the variations of pressure within said gas main.

5. The combination with a gas main, of a pipe connected therewith and also to a cooler, a suction pipe leading from said cooler and connected to the inlet side of a substantially constant speed exhauster, a delivery main connected with the discharge side of said exhauster, a by-pass pipe connecting said suction pipe and said delivery main, a butterfly valve pivotally mounted on a stem journaled in said by-pass pipe, said stem being provided with a pair of oppositely extending levers secured thereon, a line shaft provided with a similar pair of levers secured thereon, connections extending between said pairs of levers, a pulley mounted on said line shaft, a flexible connection passing over said pulley, one end of which is secured to the moving portion of a liquid-sealed gasometer, and a pipe connection leading from said gas main to the interior of said gasometer, whereby said butterfly valve is operated to open, close, or partially open said by-pass pipe and thereby maintain a substantially constant pressure in said gas main, independent of the quantity of gas in said main or in the delivery pressure of the gas from said exhauster.

In witness whereof I hereunto affix my signature.

HARRY T. KELLY.